United States Patent
Gao (10) Patent No.: US 10,389,801 B2
(45) Date of Patent: Aug. 20, 2019

(54) SERVICE REQUEST PROCESSING METHOD, RELATED APPARATUS, AND SYSTEM

(71) Applicant: HUAWEI TECHNOLOGIES CO., LTD., Shenzhen, Guangdong (CN)

(72) Inventor: Dawei Gao, Lima (PE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 15/712,927

(22) Filed: Sep. 22, 2017

(65) Prior Publication Data
US 2018/0013822 A1    Jan. 11, 2018

Related U.S. Application Data

(63) Continuation of application No. PCT/CN2015/097406, filed on Dec. 15, 2015.

(30) Foreign Application Priority Data

Mar. 31, 2015    (CN) .......................... 2015 1 0148072

(51) Int. Cl.
G06F 15/16    (2006.01)
H04L 29/08    (2006.01)
H04L 12/24    (2006.01)

(52) U.S. Cl.
CPC .......... *H04L 67/1031* (2013.01); *H04L 29/08* (2013.01); *H04L 41/5003* (2013.01);
(Continued)

(58) Field of Classification Search
CPC . H04L 67/1031; H04L 29/08; H04L 41/5003; H04L 41/5019; H04L 67/1002; H04L 67/1008; H04L 67/1012
(Continued)

(56) References Cited

U.S. PATENT DOCUMENTS 7,707,287 B2 *   4/2010   Shafir ..................... H04L 63/02
                                                                 709/217
8,144,587 B2 *   3/2012   Heinz ..................... H04L 45/00
                                                                 370/235
(Continued)

FOREIGN PATENT DOCUMENTS

CN        1960521 A      5/2007
CN      102025630 A      4/2011
(Continued)

OTHER PUBLICATIONS

Extended European Search Report dated Feb. 8, 2018 in corresponding European Patent Application No. 15887311.7, 8 pgs.
(Continued)

*Primary Examiner* — Melvin H Pollack
(74) *Attorney, Agent, or Firm* — Staas & Halsey LLP (57) ABSTRACT

A service request processing method, a related apparatus, and a system are provided. In the service request processing method provided in embodiments of the present invention, after receiving a service request reported by a network element, a load balancer first determines whether status information of a data node that corresponds to the service request indicates that the data node is available; and rejects, if the status information indicates that the data node is unavailable, to deliver the service request to an application node.

17 Claims, 4 Drawing Sheets

(52) U.S. Cl.
CPC ...... *H04L 41/5019* (2013.01); *H04L 67/1002* (2013.01); *H04L 67/1008* (2013.01); *H04L 67/1012* (2013.01)

(58) Field of Classification Search
USPC .......................................................... 709/226
See application file for complete search history.

(56) References Cited

U.S. PATENT DOCUMENTS

| | | | |
|---|---|---|---|
| 9,294,482 B2 * | 3/2016 | Mellor | H04L 63/102 |
| 9,396,500 B2 * | 7/2016 | Barkett | G06Q 50/01 |
| 9,407,560 B2 * | 8/2016 | Crisan | H04L 47/2425 |
| 9,836,352 B2 * | 12/2017 | Resch | G06F 11/1076 |
| 9,998,531 B2 * | 6/2018 | Tan | H04L 67/1038 |
| 10,235,204 B2 * | 3/2019 | LaChiusa | G06F 11/3072 |
| 2006/0187829 A1 | 8/2006 | Heiner et al. | |
| 2009/0233618 A1 | 9/2009 | Bai et al. | |
| 2012/0233248 A1 | 9/2012 | Zou et al. | |
| 2013/0077473 A1 | 3/2013 | Ojha et al. | |
| 2016/0057075 A1 * | 2/2016 | Parikh | H04L 47/762 709/226 |
| 2017/0250888 A1 * | 8/2017 | Zhu | H04L 43/0817 |
| 2017/0366606 A1 * | 12/2017 | Ben-Shaul | H04L 67/1097 |

FOREIGN PATENT DOCUMENTS

| | | |
|---|---|---|
| CN | 102075409 A | 5/2011 |
| CN | 102148850 A | 8/2011 |

OTHER PUBLICATIONS

International Search Report dated Feb. 25, 2016 corresponding to International Patent Application No. PCT/CN2015/097406.
International Search Report dated Feb. 25, 2016 in corresponding International Patent Application No. PCT/CN2015/097406.
Chinese Office Action dated Sep. 18, 2018 in corresponding Chinese Patent Application No. 201510148072.5, 8 pgs.

* cited by examiner

SERVICE REQUEST PROCESSING METHOD, RELATED APPARATUS, AND SYSTEM

CROSS-REFERENCE TO RELATED APPLICATIONS

This application is a continuation of International Application No. PCT/CN2015/097406, filed on Dec. 15, 2015, which claims priority to Chinese Patent Application No. 201510148072.5, filed on Mar. 31, 2015, The disclosures of the aforementioned applications are hereby incorporated by reference in their entireties.

TECHNICAL FIELD

The present disclosure relates to the field of communications technology, and specifically, to a service request processing method, a related apparatus, and a message processing system.

BACKGROUND

A telecommunication service, such as a call service and a charging service, requires quite high reliability. Correspondingly, a telecommunications device processing the telecommunication service requires relatively high reliability. Clustering deployment is applied to an existing telecommunications device. After the clustering deployment, multiple telecommunications device nodes are obtained, including redundant data nodes and production nodes. High reliability of the production nodes is ensured by using the redundant data nodes. The telecommunications device nodes have relatively high requirements on performance indicators, response times are generally at a millisecond level, and each node can receive thousands of service requests per second.

For a solution of clustering deployment, application nodes processing sessions and data nodes storing data are separately deployed on different devices. An application node receives a service request sent from a load balancer, interacts with a data node according to the service request, and returns a service answer message to the load balancer. When receiving multiple service requests, the application node adds the service requests to a session queue, and processes the service requests in the session queue in order.

However, by means of the solution of the clustering deployment provided in the prior art, if a fault occurs to a data node, for example, if data that corresponds to some service requests is unavailable in the data node, a timeout occurs when the application node processes the service requests, and consequently, the session queue is continuously occupied. As the application node receives more service requests, fewer parts of the session queue are available for the application node. In this case, congestion occurs in the session queue, and service requests for other normal data nodes cannot be processed in time, lowering efficiency of processing service requests.

SUMMARY

Embodiments of the present invention provide a service request processing method, an apparatus, and a message processing system to prevent congestion from occurring in a session queue in an application node.

According to a first aspect, an embodiment of the present invention provides a service request processing method for a load balancer, including:
receiving a service request reported by a network element, and obtaining status information of a data node that corresponds to the service request; and
when the status information of the data node indicates that the data node is unavailable, rejecting to deliver the service request to an application node; or temporarily storing the service request, and when the status information of the data node changes to that the data node is available, delivering the temporarily stored service request to an application node.

With reference to the first aspect, in a first possible implementation manner, the obtaining status information of a data node that corresponds to the service request includes:
obtaining an identifier of a data node that corresponds to a number segment to which a user identifier carried in the service request belongs; and
obtaining current status information of the data node that corresponds to the identifier of the data node.

According to a second aspect, an embodiment of the present invention provides a service request processing method for an application node, including:
receiving a service request sent by a load balancer;
requesting, according to the service request, to access data in a data node, and when an access failure occurs, obtaining service level agreement SLA information of a session that corresponds to the service request;
obtaining status information of the data node according to the SLA information; and
sending an evaluation response message to the load balancer, where the evaluation response message carries the status information of the data node.

With reference to the second aspect, in a first possible implementation manner, the obtaining service level agreement SLA information of a session that corresponds to the service request includes:
obtaining a start time and an end time at which the session that corresponds to the service request is processed; and
determining a delay of the session according to the start time and the end time, where the SLA information includes the delay.

With reference to the second aspect or the first possible implementation manner of the second aspect, in a second possible implementation manner, the method further includes: after the status information of the data node is updated, sending an evaluation response message to the load balancer, where the evaluation response message carries the updated status information of the data node.

According to a third aspect, an embodiment of the present invention further provides a load balancer, including:
a first receiving unit, configured to receive a service request reported by a network element, and obtain status information of a data node that corresponds to the service request; and
a first processing unit, configured to: when the status information of the data node indicates that the data node is unavailable, reject to deliver the service request to an application node; or temporarily store the service request, and when the status information of the data node changes to that the data node is available, deliver the temporarily stored service request to an application node.

With reference to the third aspect, in a first possible implementation manner, the obtaining, by the first receiving unit, status information of a data node that corresponds to the service request includes:

obtaining an identifier of a data node that corresponds to a number segment to which a user identifier carried in the service request belongs; and obtaining current status information of the data node that corresponds to the identifier of the data node.

According to a fourth aspect, an embodiment of the present invention provides an application node, including:

a second receiving unit, configured to receive a service request sent by a load balancer;

a session information obtaining unit, configured to: request, according to the service request, to access data in a data node, and when an access failure occurs, obtain service level agreement SLA information of a session that corresponds to the service request;

a status obtaining unit, configured to obtain status information of the data node according to the SLA information; and a response sending unit, configured to send an evaluation response message to the load balancer, where the evaluation response message carries the status information of the data node.

With reference to the fourth aspect, in a first possible implementation manner, the obtaining, by the session information obtaining unit, service level agreement SLA information of a session that corresponds to the service request includes:

obtaining, by the session information obtaining unit, a start time and an end time at which the session that corresponds to the service request is processed; and determining a delay of the session according to the start time and the end time, where the SLA information includes the delay.

According to a fifth aspect, an embodiment of the present invention provides a service request processing system, including the load balancer according to the third aspect and the application node according to the fourth aspect.

In the service request processing method provided in the embodiments of the present invention, after receiving a service request reported by a network element, a load balancer first determines whether status information of a data node that corresponds to the service request indicates that the data node is available; and rejects, if the status information indicates that the data node is unavailable, to deliver the service request to an application node. According to the embodiments of the present invention, the received service request may be temporarily stored, and the temporarily stored service request is delivered to an application node when the status information of the data node changes to that the data node is available, thereby avoiding a case, in the prior art in which a service request is delivered to an application node when a status of a data node is unavailable, causing that a large quantity of service requests are congested in a session queue in the application node. Compared with the prior art, in the embodiments of the present invention, service requests for other normal data nodes can be processed in time, thereby improving overall efficiency of processing service requests.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
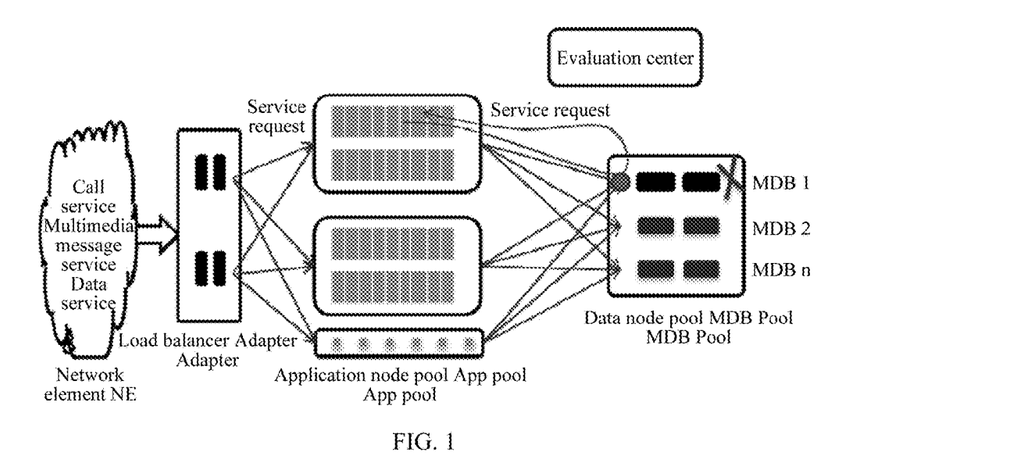
FIG. 1 is an overall architectural diagram of a service request processing system according to an embodiment of the present invention.

The present invention provides a service request processing method, an apparatus, and a message processing system. Referring to FIG. 1, FIG. 1 is an overall architectural diagram of a service request processing system according to an embodiment of the present invention.

As shown in the figure, the service request processing system mainly includes a load balancer adapter, an application node pool APP pool, a data node pool MDB pool (including MDB1, MDB2, and MDBn in the figure), and an evaluation center. The load balancer and application nodes are independently disposed. A telecommunications application (for example, a call processing application or a charging application) is deployed in the application node pool in a clustering manner. The application node pool includes multiple application nodes, the multiple application nodes constitute a peer cluster, and each application node can process any service and any client. Data nodes are established or borne by using a memory database (Memory DataBase, MDB) technology. The data node pool includes multiple data nodes, and one data node stores data of a client segment, for example, stores an account balance or a tariff package of a client having an identifier of 13000000000 to 13000009999. In this embodiment, the evaluation center is independently disposed. In another implementation manner, the evaluation center may be integrated with an application node. That is, each application node includes one evaluation center. In addition, the evaluation center may be integrated with a data node. That is, each data node includes one evaluation center.

When a telecommunications service is operated, a network element outside the service request processing system sends a service request, such as a call service request, a multimedia message service request, a data service request, or a charging request, to the load balancer.

Figure 2:
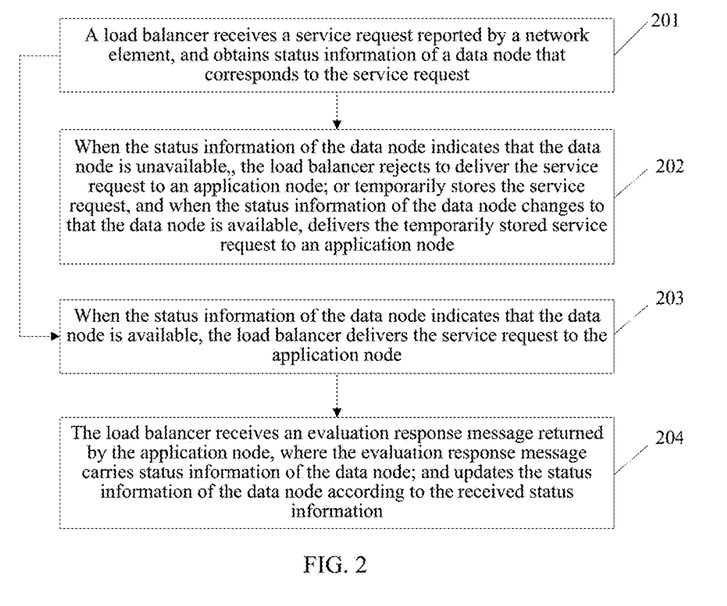
FIG. 2 is a flowchart of a service request processing method according to Embodiment 1 of the present invention.

A service request processing method for a load balancer provided in an embodiment of the present invention is shown in FIG. 2, and mainly includes the following steps.

Step 201: The load balancer receives a service request reported by a network element, and obtains status information of a data node that corresponds to the service request.

In this embodiment of the present invention, the load balancer stores status information of data nodes in a data node pool. The load balancer obtains status information of a data node that corresponds to a number segment to which a user identifier (for example, a calling number or a called number) in the service request belongs, and then determines whether the status information indicates that the data node is available. The status information includes that the data node is available or unavailable. If the status information indicates that the data node is available, it indicates that data in the data node can be accessed; or if the status information indicates that the data node is unavailable, it indicates that data in the data node cannot be accessed, that is, the data node is faulty.

Specifically, the load balancer stores a correspondence between an identifier of a data node and status information of the data node. An initial value of the status information of the data node indicates that the data node is available. That is, a status of the data node is initially available by default. The load balancer may obtain an identifier of the data node that corresponds to the user identifier in the received service request, where the data node stores user data that corresponds to the user identifier; and then searches for current status information of the data node according to the identifier, and determines, according to the status information, whether the data node is available. Different service requests from a same user correspond to a same data node, and same user information is accessed.

Step 202: When the status information of the data node indicates that the data node is unavailable, the load balancer rejects to deliver the service request to an application node; or temporarily stores the service request, and when the status information of the data node changes to that the data node is available, delivers the temporarily stored service request to an application node.

In this embodiment, when determining that the status information of the data node in which the user data is stored indicates that the data node is unavailable, the load balancer rejects to deliver the service request to the application node. The load balancer may directly delete the service request, or automatically abandon the service request after the service request is over time.

Optionally, the load balancer may first temporarily store the service request when determining that the status information of the data node indicates that the data node is unavailable, and when the status information of the data node changes from that the data node is unavailable to that the data node is available, deliver the temporarily stored service request to the application node according to a load balancing policy.

That the status information of the data node changes from that the data node is unavailable to that the data node is available may be manually configured to the load balancer, or may be notified to the load balancer by the application node or the data node.

Step 203: When the status information of the data node indicates that the data node is available, the load balancer delivers the service request to the application node.

Specifically, after obtaining the status information of the data node in step 201, if the load balancer determines that the status information of the data node in which the user data is stored is available, that is, when the data node is in a normal state, the load balancer delivers the service request to the application node, so that the application node normally processes the service request.

In this embodiment, an application node that processes a service request also functions as an evaluation center; or an evaluation center is disposed in the application node. If status information of a data node changes, when the application node processes a service request delivered by the load balancer, from that the data node is available to that the data node is unavailable that is, if a fault occurs, the application node cannot access the data node. In this case, the application node evaluates a status of the data node, and returns evaluation response information that carries status information of the data node. Specifically, the application node or the evaluation center may send the status information of the data node by using a diameter credit control (Diameter Credit Control, DCC) message.

Step 204: The load balancer receives an evaluation response message returned by the application node, where the evaluation response message carries status information of the data node; and updates the status information of the data node according to the received status information.

Specifically, the load balancer receives the evaluation response message returned by the application node, where the evaluation response message carries the status information of the data node and an identifier of the data node. The load balancer further updates the stored status information of the data node according to the received status information, so as to find latest status information of the data node after a service request is subsequently received, and process the service request according to the latest status information.

In the service request processing method provided in this embodiment of the present invention, after receiving a service request reported by a network element, a load balancer first determines whether status information of a data node that corresponds to the service request indicates that the data node is available; and rejects, if the status information indicates that the data node is unavailable, to deliver the service request to an application node. According to this embodiment of the present invention, the received service request may be temporarily stored, and the temporarily stored service request is delivered to an application node when the status information of the data node changes to that the data node is available, thereby avoiding a case, in the prior art, in which a service request is delivered to an application node when a status of a data node is unavailable, causing that a large quantity of service requests are congested in a session queue in the application node. Compared with the prior art, in this embodiment of the present invention, an application node can process service requests for other normal data nodes in time, thereby improving overall efficiency of processing service requests.

Figure 3:
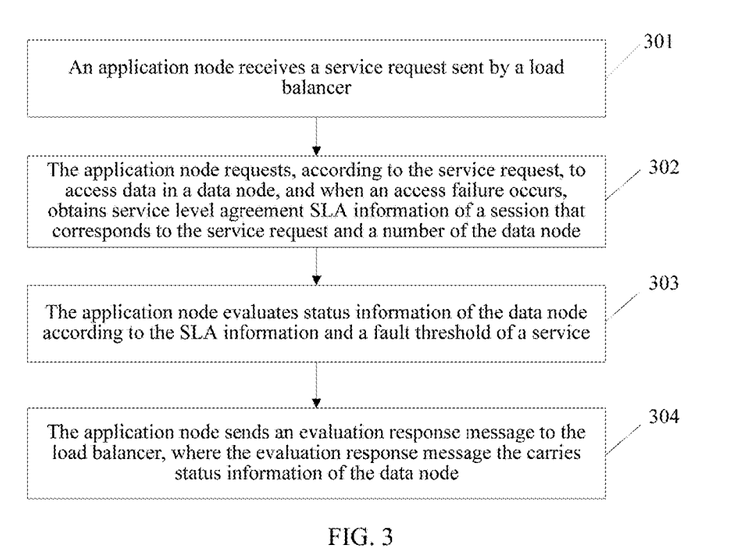
FIG. 3 is a flowchart of a service request processing method according to Embodiment 2 of the present invention.

Referring to FIG. 3, FIG. 3 is a flowchart of a service request processing method for an application node according to Embodiment 2 of the present invention.

As shown in the figure, the service request processing method provided in this embodiment mainly includes the following steps.

Step 301: An application node receives a service request sent by a load balancer.

Specifically, the application node receives the service request sent by the load balancer, and the service request is from a network element outside a service request processing system, for example, an external charging system, a call processing center, or a short message service center. The service request may be a call service request, a multimedia message service request, a data service request, a charging request, or the like.

Step 302: The application node requests, according to the service request, to access data in a data node, and when an access failure occurs, obtains service level agreement SLA information of a session that corresponds to the service request and an identifier of the data node.

Specifically, the application node requests to access data in data node that corresponds to a number segment to which a user identifier belongs. For example, the application node requests, according to a number segment to which a calling number in a call request belongs, tariff information of the calling number from a corresponding data node. After receiving a service request, the application node establishes a session locally to process the service request.

In this embodiment, when the application node fails to access the data node, for example, the data node cannot return the data requested by the application node, the application node obtains the service level agreement (Service Level Agreement, SLA) information of the session that corresponds to the service request and the identifier of the data node. The SLA information may be a parameter such as a delay of the session or an error rate. Specifically, the application node may obtain a start time and an end time at which the session that corresponds to the service request is processed, and determine the delay of the session according to the start time and the end time. If a timeout of processing the session is caused by a data node fault, the session does not have an end time, and the application node may obtain the start time at which and timeout duration in which the session that corresponds to the service request is processed, and determine the delay of the session according to the start time and the timeout duration.

Step 303: The application node evaluates status information of the data node according to the SLA information and a fault threshold of a service.

In this embodiment, that the application node obtains status information of the data node according to the SLA information is specifically: evaluating, by the application node, the status information of the data node according to the SLA information and the fault threshold of the service. In this case, the application node also functions as an evaluation center.

The fault threshold of the service may be preset in the application node, and the fault threshold is used to be compared with the SLA information, to determine whether a status of the data node is available. Different fault threshold corresponds to different services. For example, a data service and a voice call service correspond to different fault thresholds, a fault threshold of a voice service is a delay greater than 300 ms, and a fault threshold of a data service is a delay greater than 500 ms. The application node evaluates the status information of the data node according to delay information of the foregoing session and the corresponding fault threshold; when the delay does not exceed the fault threshold of the service, determines that the status information of the data node indicates that the data node is available; and when the delay exceeds the fault threshold of the service, determines that the status information of the data node indicates that the data node is unavailable. The "exceed" in this specification is referred to as "greater than".

Step 304: The application node sends an evaluation response message to the load balancer, where the evaluation response message carries the status information of the data node.

In this embodiment, the application node may send, to the load balancer after evaluating the obtained status information of the data node, the evaluation response message that carries the status information of the data node and the identifier of the data node, to notify the load balancer to update the status information of the data node. Specifically, the application node may send the status information of the data node by using a diameter credit control (Diameter Credit Control, DCC) message.

In this embodiment of the present invention, there are multiple application nodes in an application node pool, and evaluation results of status information of a same data node that are provided by the application nodes may be different. Therefore, after the different evaluation results are fed back to the load balancer, the load balancer may update locally stored status information of the data node in chronological order of receiving evaluation response messages. In another implementation manner, after receiving the first evaluation response message that carries status information indicating that the data node is unavailable, the load balancer may determine, that the status information of the data node indicates that the data node is unavailable; not update the status information of the data node after an evaluation response message that is for the data node and that carries status information indicating that the data node is available is subsequently received; and update the status information of the data node after received status information sent by the data node indicates that the data node is available.

In the service request processing system provided in this embodiment of the present invention, when determining that a data node cannot be accessed, an application node obtains SLA information of a session that corresponds to a service request; and then further determines, according to the SLA information and a preset fault threshold, whether a status of the data node is available, and notifies a load balancer of status information of the data node, so that after subsequently receiving a service request that corresponds to the data node, the load balancer rejects to deliver the service request to the application node. In the prior art, an application node is only responsible for processing a service request. By comparison, a case, in the prior art, in which a service request is delivered to an application node when a status of a data node is unavailable, causing that a large quantity of service requests are congested in a session queue in the application node is avoided in this embodiment. According to this embodiment of the present invention, service requests in other normal data nodes can be processed in time, thereby improving overall efficiency of processing service requests.

Optionally, to further improve accuracy of determining the status information of the data node, the evaluating, by the application node, status information of the data node according to the SLA information and a fault threshold of a service includes:

detecting whether the SLA information of the session that corresponds to the service request exceeds the fault threshold of the service, and counting a quantity of times for which a case that the SLA information exceeds the fault threshold occurs within a preset time, where in this embodiment, the application node continuously counts a quantity of service requests for which SLA information exceeds the fault threshold of the service within the preset time;

when the quantity of service requests for which the SLA information exceeds the fault threshold within the preset time is greater than a first threshold, determining that the status information of the data node indicates that the data node is unavailable; and when the quantity of service requests for which the SLA information exceeds the fault threshold within the preset time is less than or equal to the first threshold, determining that the status information of the data node indicates that the data node is available.

Specifically, for a voice service, the preset time may be 1 minute, and the first threshold may be 10. If a quantity of service requests having delays greater than 300 ms within 1 minute is greater than the first threshold 10, it is determined that the status information of the data node indicates that the data node is unavailable; or if a quantity of service requests having delays greater than 300 ms within 1 minute is less than or equal to the first threshold 10, it is determined that the status information of the data node indicates that the data node is available. For a data service, the preset time may be 1 minute, and the first threshold may be 20. Correspondingly, if a quantity of voice service requests having delays greater than 500 ms within 1 minute is greater than 20, it is determined that the status information of the data node indicates that the data node is unavailable; or if voice service requests having delays greater than 500 ms within 1 minute is less than or equal to 20, it is determined that the status information of the data node indicates that the data node is available.

Compared with a manner of determining status information of a data node merely by determining whether a delay exceeds a fault threshold, in this embodiment, status information of a data node is determined with reference to a fault threshold and a first threshold, so that accuracy of determining status information of a data node can be improved.

Figure 4:
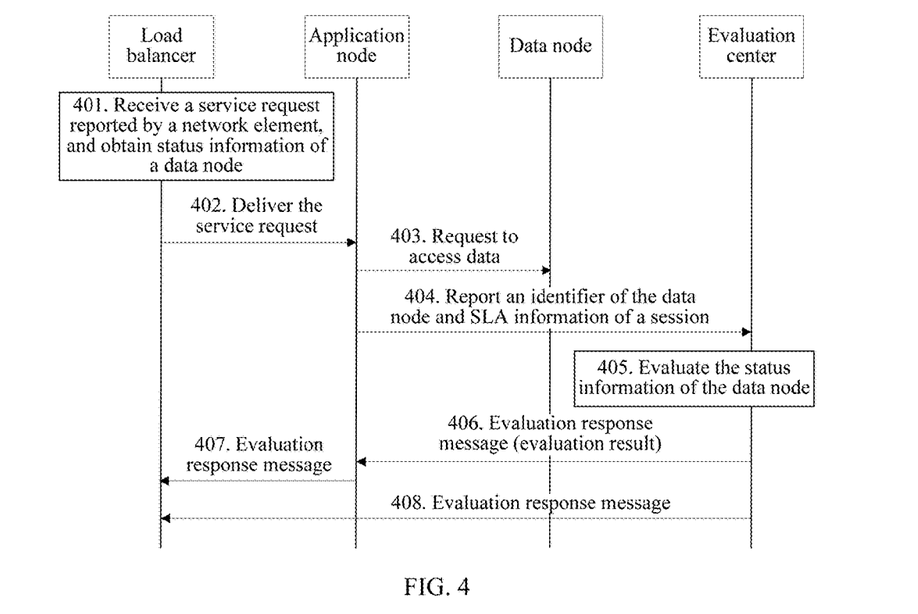
FIG. 4 is a flowchart of a service request processing method according to Embodiment 3 of the present invention.

Referring to FIG. 4, FIG. 4 is a flowchart of a service request processing method for an evaluation center according to Embodiment 3 of the present invention.

In this embodiment of the present invention, the evaluation center and application nodes are independently disposed, and multiple application nodes may share one global evaluation center. In this embodiment of the present invention, devices that interact with each other include a network element outside a service request processing system, a load balancer, an application node, a data node, and the evaluation center. The network element reports a service request to a load balancer, and the service request may include a call service request, a multimedia message service request, a data service request, and a charging request.

The service request processing method provided in this embodiment of the present invention mainly includes the following steps.

Step 401: The load balancer receives a service request reported by a network element, and obtains status information of a data node that corresponds to the service request.

The load balancer decodes the received service request, obtains a user number carried in the service request, then finds an identifier of a data node that corresponds to a number segment to which the user number belongs, and further searches for the status information of the data node according to a locally stored correspondence between an identifier of a data node and status information of a data node. For example, if the received service request is a call service request, the load balancer decodes the call service request, obtains a calling number carried in the service request, and then finds an identifier of a data node that corresponds to a number segment to which the calling number belongs.

Step 402: The load balancer delivers, according to the status information of the data node, the service request to an application node.

In this embodiment, if the status information of the data node indicates that the data node is available, the load balancer delivers the service request to the application node. If the status information of the data node indicates that the data node is unavailable, the load balancer rejects to deliver the service request to the application node, to avoid that the service request is congested in the application node.

Step 403: The application node requests, according to the service request, to access data in the data node, and when an access failure occurs, obtains service level agreement SLA information of a session that corresponds to the service request and an identifier of the data node.

A specific process of performing step 403 by the application node is the same as step 302 in the foregoing Embodiment 3. Refer to description of the foregoing Embodiment 3 for details.

Step 404: The application node reports the identifier of the data node and the service level agreement SLA information of the session to the evaluation center.

In this embodiment, the obtaining, by the application node, the status information of the data node according to the SLA information is specifically: reporting, by the application node, the identifier of the data node and the service level agreement SLA information of the session to the evaluation center, so that the evaluation center evaluates the status information of the data node.

Step 405: The evaluation center evaluates the status information of the data node according to the received SLA information and a fault threshold of a service.

The fault threshold of the service may be preset in the evaluation center, and the fault threshold is used to be compared with the SLA information, to determine whether a status of the data node is available. Different fault threshold corresponds to different services. For example, a data service and a voice call service correspond to different fault thresholds, a fault threshold of the voice service is a delay greater 200 ms, and a fault threshold of the data service is a delay greater than 500 ms. The evaluation center evaluates the status information of the data node according to the received SLA information, such as a delay, and the corresponding fault threshold; when the delay does not exceed the fault threshold of the service, determines that the status information of the data node indicates that the data node is available; and when the delay exceeds the fault threshold of a service, determines that the status information of the data node indicates that the data node is unavailable.

It should be noted that, the evaluation center may receive identifiers of data nodes and SLA information of sessions that are reported by multiple application nodes; classify received information according to the identifiers of the data nodes; and then evaluate the status information of the data node according to summarized SLA information.

Step 406: The evaluation center sends an evaluation response message to the application node, where the evaluation response message carries the status information of the data node.

In this embodiment, after evaluating and determining the status information of the data node, the evaluation center returns the evaluation response message to the application node, where the evaluation response message carries the status information of the data node and the identifier of the data node. For example, 1 indicates that the data node is available, and 0 indicates that the data node is unavailable.

Step 407: The application node sends an evaluation response message to the load balancer, where the evaluation response message carries the status information of the data node.

In this embodiment, the application node may send, to the load balancer after evaluating the obtained status information of the data node, the evaluation response message that carries the status information of the data node and the identifier of the data node, to notify the load balancer to update the status information of the data node. The load balancer updates the status information of the data node according to the received evaluation response message.

Step 408: After the status information of the data node is updated, the evaluation center sends an evaluation response message to the load balancer, where the evaluation response message carries the updated status information of the data node.

In this embodiment, if the evaluation center receives a notification message indicating that a status of the data node changes from unavailable to available (for example, a faulty data node is manually recovered and the evaluation center is notified), the evaluation center sends an evaluation response message to the load balancer, where the evaluation response message carries updated status information of the data node, so that the load balancer updates the status information of the data node.

In the service request processing method provided in this embodiment of the present invention, when determining that a data node cannot be accessed, an application node obtains SLA information of a session that corresponds to a service request; and then further determines, according to the SLA information and a preset fault threshold, whether a status of the data node is available, and notifies a load balancer of status information of the data node, so that after subsequently receiving a service request that corresponds to the data node, the load balancer rejects to deliver the service request to the application node. In the prior art, an application node is only responsible for processing a service request. By comparison, a case, in the prior art, in which a service request is delivered to an application node when a status of a data node is unavailable, causing that a large quantity of service requests are congested in a session queue in the application node is avoided in this embodiment. According to this embodiment of the present invention, service requests in other normal data nodes can be processed in time, thereby improving overall efficiency of processing service requests.

Optionally, the evaluation center may further use the following manner to evaluate the status information of the data node:

counting a quantity of service requests for which SLA information exceeds the fault threshold of the service within a preset time;

when the quantity of service requests for which the SLA information exceeds the fault threshold within the preset time is greater than a first threshold, determining, that the status information of the data node indicates that the data node is unavailable; and when the quantity of service requests for which the SLA information exceeds the fault threshold within the preset time is less than or equal to the first threshold, determining that the status information of the data node indicates that the data node is available.

Specifically, for a voice service, the preset time may be 1 minute, and the first threshold may be 10. If a quantity of service requests having delays greater than 200 ms within 1 minute is greater than the first threshold 10, it is determined that the status information of the data node indicates that the data node is unavailable; or if a quantity of service requests having delays greater than 200 ms within 1 minute is less than or equal to the first threshold 10, it is determined that the status information of the data node indicates that the data node is available. For a data service, the preset time may be 1 minute, and the first threshold may be 20. Correspondingly, if a quantity of voice service requests having delays greater than 500 ms within 1 minute is greater than 20, it is determined that the status information of the data node indicates that the data node is unavailable; or if voice service requests having delays greater than 500 ms within 1 minute is less than or equal to 20, it is determined that the status information of the data node indicates that the data node is available.

Compared with a manner of determining status information of a data node merely by determining whether a delay exceeds a fault threshold, in this embodiment, status information of a data node is determined with reference to a fault threshold and a first threshold, so that accuracy of determining status information of a data node can be improved.

Figure 5:
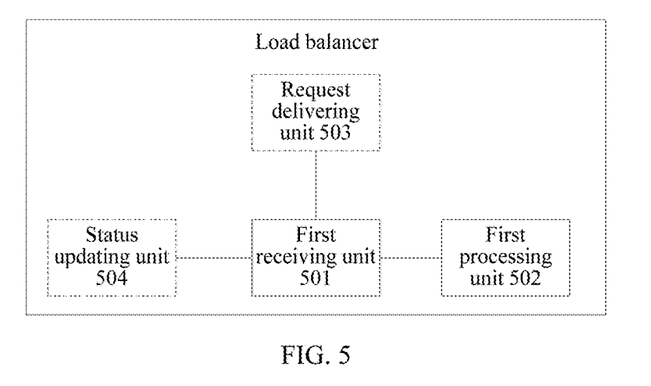
FIG. 5 is a function module diagram of a load balancer according to Embodiment 4 of the present invention.

Referring to FIG. 5, FIG. 5 is a function module diagram of a load balancer according to Embodiment 4 of the present invention. As shown in the figure, the load balancer provided in this embodiment of the present invention includes:

a first receiving unit 501, configured to receive a service request reported by a network element, and obtain status information of a data node that corresponds to the service request; and a first processing unit 502, configured to: when the status information of the data node indicates that the data node is unavailable, reject to deliver the service request to an application node; or temporarily store the service request, and when the status information of the data node changes to that the data node is available, deliver the temporarily stored service request to the application node. The rejecting, by the first processing unit 502, to deliver the service request to an application node includes: discarding the service request.

In this embodiment, the obtaining, by the first receiving unit 501, status information of a data node that corresponds to the service request includes:

obtaining, by the first receiving unit 501, an identifier of a data node that corresponds to a number segment to which a user identifier carried in the service request, and obtaining current status information of the data node that corresponds to the identifier of the data node.

Still referring to FIG. 5, the load balancer provided in this embodiment further includes:

a request delivering unit 503, configured to: when the status information of the data node indicates that the data node is available, deliver the service request to the application node.

In the load balancer provided in this embodiment, the first receiving unit 501 is further configured to receive an evaluation response message returned by the application node, where the evaluation response message carries status information of the data node.

Correspondingly, the load balancer further includes a status updating unit 504, configured to update the status information of the data node according to the received status information.

The load balancer provided in Embodiment 4 of the present invention may be used in the foregoing corresponding Method Embodiment 1 to Method Embodiment 3. Refer to the foregoing method embodiments for details of a specific process of participating in the service request processing method by the load balancer and beneficial effects, and details are not described herein again.

Figure 6:
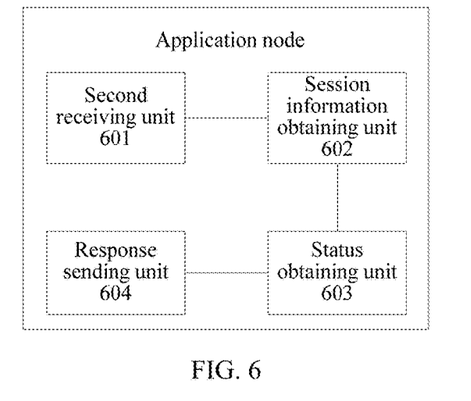
FIG. 6 is a function module diagram of an application node according to Embodiment 5 of the present invention.

Referring to FIG. 6, FIG. 6 is a function module diagram of an application node according to Embodiment 5 of the present invention. As shown in the figure, the application node provided in this embodiment of the present invention includes:

a second receiving unit 601, configured to receive a service request sent by a load balancer;

a session information obtaining unit 602, configured to: request, according to the service request, to access data in a data node, and when an access failure occurs, obtain service level agreement SLA information of a session that corresponds to the service request;

a status obtaining unit 603, configured to obtain status information of the data node according to the SLA information; and a response sending unit 604, configured to send an evaluation response message to the load balancer, where the evaluation response message carries the status information of the data node.

In the application node provided in this embodiment, the obtaining, by the session information obtaining unit 602, service level agreement SLA information of a session that corresponds to the service request specifically includes:

obtaining, by the session information obtaining unit 602, a start time and an end time at which the session that corresponds to the service request is processed; and determining, by the session information obtaining unit 602, a delay of the session according to the start time and the end time, where the SLA information includes the delay.

In the application node provided in this embodiment, the obtaining, by the status obtaining unit 603, status information of the data node according to the SLA information specifically includes:

evaluating, by the status obtaining unit 603, the status information of the data node according to the SLA information and a fault threshold of a service; or reporting, to an evaluation center by the status obtaining unit 603, an identifier of the data node and the service level agreement SLA information of the session, and receiving an evaluation response message returned by the evaluation center, where the evaluation response message carries status information of the data node.

In the application node provided in this embodiment, the evaluating, by the status obtaining unit 603, the status information of the data node according to the SLA information and a fault threshold of a service further includes:

counting, by the status obtaining unit 603, a quantity of service requests for which SLA information exceeds the fault threshold within a preset time; when the quantity of service requests for which the SLA information exceeds the fault threshold within the preset time is greater than a first threshold, determining that the status information of the data node indicates that the data node is unavailable; and when the quantity of service requests for which the SLA information exceeds the fault threshold is less than or equal to the first threshold, determining that the status information of the data node indicates that the data node is available.

Further, referring to FIG. 6, the response sending unit 604 in the application node provided in this embodiment is further configured to: after the status information of the data node is updated, send an evaluation response message to the load balancer, where the evaluation response message carries the updated status information of the data node.

The application node provided in Embodiment 5 of the present invention may be used in the foregoing corresponding Method Embodiment 2, the application node also functions as an evaluation center, or an evaluation center is disposed in the application node. Refer to the foregoing method embodiments for details of a specific process of participating in the service request processing method by the application node and beneficial effects, and details are not described herein again.

Figure 7:
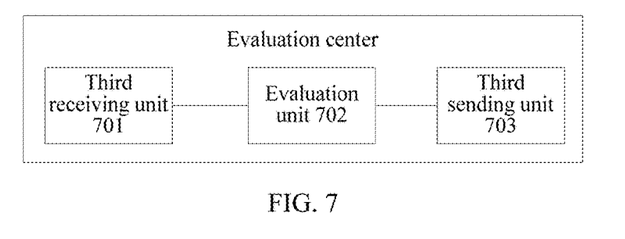
FIG. 7 is a function module diagram of an evaluation center according to Embodiment 6 of the present invention.

Referring to FIG. 7, FIG. 7 is a function module diagram of an evaluation center according to Embodiment 6 of the present invention.

As shown in the figure, the evaluation center provided in this embodiment mainly includes:

a third receiving unit 701, configured to receive an identifier of a data node that is sent by an application node and service level agreement SLA information of a session that corresponds to the service request;

an evaluation unit 702, configured to evaluate status information of the data node according to the SLA information and a fault threshold of a service; and a third sending unit 703, configured to send an evaluation response message to the load balancer, where the evaluation response message carries status information of the data node.

In the evaluation center provided in this embodiment, the evaluating, by the evaluation unit 702 according to the SLA information and a fault threshold of a service, the status information of the data node includes:

counting, by the evaluation unit 702 within a preset time, a quantity of service requests for which SLA information exceeds fault thresholds; when the quantity of service requests for which SLA information exceeds fault thresholds within a preset time is greater than a first threshold, determining that the status information of the data node indicates that the data node is unavailable; and when the quantity of service requests for which SLA information exceeds fault thresholds is less than or equal to the first threshold, determining that the status information of the data node indicates that the data node is available.

Further, referring to FIG. 7, the third sending unit 703 in the evaluation center provided in this embodiment is further configured to: after the status information of the data node is updated, send an evaluation response message to the load balancer, where the evaluation response message carries the updated status information of the data node.

The evaluation center provided in Embodiment 6 of the present invention may be used in the foregoing corresponding Method Embodiment 1 to Method Embodiment 3. Refer to the foregoing method embodiments for details of a specific process of participating in the service request processing method by the evaluation center and beneficial effects, and details are not described herein again.

Figure 8:
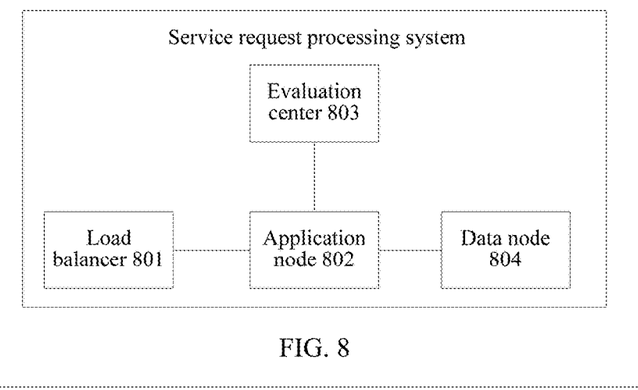
FIG. 8 is a function module diagram of a message processing system according to Embodiment 7 of the present invention.

Referring to FIG. 8, FIG. 8 is a function module diagram of a service request processing system according to Embodiment 7 of the present invention.

As shown in the figure, the service request processing system provided in this embodiment of the present invention mainly includes a load balancer 801, an application node 802, an evaluation center 803, and a data node 804. Specific function components of the load balancer 801 are the same as function components of the load balancer in the foregoing Embodiment 4. Refer to description in the foregoing embodiment for details. Specific function components of the application node 802 are the same as function components of the application node in the foregoing Embodiment 5. Refer to description in the foregoing embodiment for details.

Specific function components of the evaluation center 803 are the same as function components of the evaluation center in the foregoing Embodiment 6. Refer to description in the foregoing embodiment for details. It should be noted that, the application node 802 and the evaluation center 803 may be independently disposed or integrated, and further, the application node 802 or the evaluation center 803 can independently implement functions of the application node 802 and the evaluation center 803.

Beneficial effects of the service request processing system provided in Embodiment 7 of the present invention combine beneficial effects of the load balancer, the application node, and the evaluation center in the foregoing embodiments.

Figure 9:
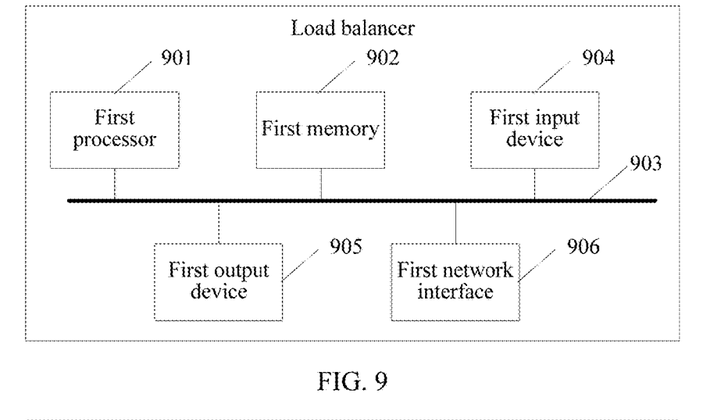
FIG. 9 is a schematic structural diagram of a load balancer according to Embodiment 8 of the present invention.

Referring to FIG. 9, FIG. 9 is a schematic structural diagram of a load balancer according to Embodiment 8 of the present invention As shown in the figure, the load balancer provided in this embodiment of the present invention includes: a first processor 901, a first memory 902, a first bus 903, a first input device 904, a first output device 905, and a first network interface 906.

The first memory 902 is configured to store a computer executable instruction, and the first processor 901 and the first memory 902 are connected by using the first bus 903. When the load balancer runs, the first processor 901 executes the computer executable instruction, so that the load balancer performs the following method:

receiving a service request reported by a network element, and obtaining status information of a data node that corresponds to the service request; and when the status information of the data node indicates that the data node is unavailable, rejecting to deliver the service request to an application node; or temporarily storing the service request, and when the status information of the data node changes to that the data node is available, delivering the temporarily stored service request to an application node.

A specific process of performing the foregoing method by the load balancer and beneficial effects are the same as the execution processes and beneficial effects of the foregoing Embodiments 1, 2, and 3. The method is based on the same concept as the method embodiments of the present invention. Refer to description in the Method Embodiments 1, 2, and 3 for specific content.

The first input device 904 may be configured to input commands and information to the load balancer. The first input device 904 may be a keyboard or a pointing device, such as a mouse, a track ball, a touchpad, a microphone, a joystick, a game pad, a disc satellite television antenna, a scanner, or a similar device. The input devices may be connected to the first processor 901 by using the first bus 903.

The first output device 905 may be used by the load balancer to output information. The first output device 905 may be a monitor, or may be other peripheral output devices, such as a loudspeaker and/or a printing device, and the output devices may be connected to the first processor 901 by using the first bus 903.

The load balancer may be connected to a network by using the first network interface 906, for example, be connected to a local area network (Local Area Network, LAN). In a network environment, a computer executable instruction stored in the load balancer may be stored in a remote storage device, and is not limited to local storage.

The first memory 902 may include a computer storage medium in a form of a volatile and/or a non-volatile memory, such as a read-only memory and/or a random access memory. The first memory 902 may further include an operating system, an application program, other program modules and program data.

Figure 10:
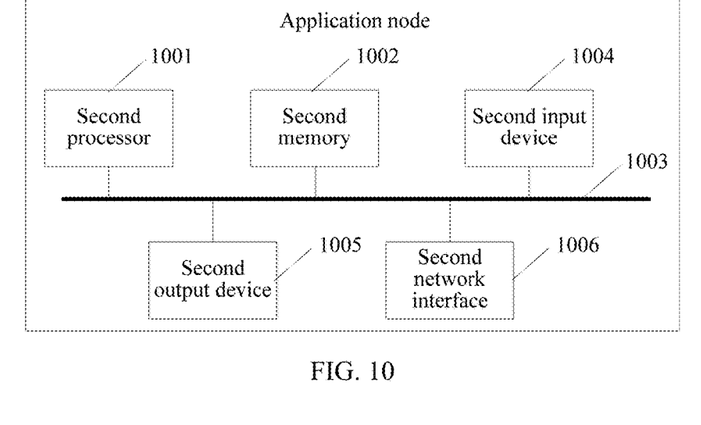
FIG. 10 is a schematic structural diagram of an application node according to Embodiment 9 of the present invention.

Referring to FIG. 10, FIG. 10 is a schematic structural diagram of an application node according to Embodiment 9 of the present invention.

As shown in the figure, the application node provided in this embodiment of the present invention includes: a second processor 1001, a second memory 1002, a second bus 1003, a second input device 1004, a second output device 1005, and a second network interface 1006.

The second memory 1002 is configured to store a computer executable instruction, and the second processor 1001 and the second memory 1002 are connected by using the second bus 1003. When the application node runs, the second processor 1001 performs the computer executable instruction, so that the application node performs the following method:

receiving a service request sent by a load balancer;

requesting, according to the service request, to access data in a data node, and when an access failure occurs, obtaining service level agreement SLA information of a session that corresponds to the service request;

obtaining status information of the data node according to the SLA information; and sending an evaluation response message to the load balancer, where the evaluation response message carries the status information of the data node.

A specific process of performing the foregoing method by the application node and beneficial effects are the same as the execution processes and beneficial effects of the foregoing Embodiment 2. The method is based on the same concept as the method embodiments of the present invention. Refer to description in the Method Embodiment 2 for specific content.

The second input device 1004 may be configured to input commands and information to the application node. The second input device 1004 may be a keyboard or a pointing device, such as a mouse, a track ball, a touchpad, a microphone, a joystick, a game pad, a disc satellite television antenna, a scanner, or a similar device. The input devices may be connected to the second processor 1001 by using the second bus 1003.

The second output device 1005 may be configured to output information by the application node. The second output device 1005 may be a monitor, or may be other peripheral output devices, such as a loudspeaker and/or a printing device, and the output devices may be connected to the second processor 1001 by using the second bus 1003.

The application node may be connected to a network by using the second network interface 1006, for example, be connected to a local area network. In a network environment, a computer executable instruction stored in the second memory 1002 may be stored in a remote storage device, and is not limited to local storage in the application node.

The second memory 1002 may include a computer storage medium in a form of a volatile and/or a non-volatile memory, such as a read-only memory and/or a random access memory. The second memory 1002 may further include an operating system, an application program, other program modules and program data.

It should be noted that content such as information exchange and an execution process between the units and the modules in the device is based on a same idea as the method embodiments of the present invention. Therefore, for detailed content, refer to descriptions in the method embodiments of the present invention, and details are not described herein again.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer readable medium may be a computer readable signal medium or a computer readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read-only memory (EPROM or flash memory), an optical fiber, and a compact disc read-only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A service request processing method for a load balancer, comprising:
   receiving a service request reported by a network element, and obtaining status information of a data node that corresponds to the service request; and
   when the status information of the data node indicates that the data node is unavailable, rejecting to deliver the service request to an application node; or temporarily storing the service request, and when the status information of the data node changes to that the data node is available, delivering the temporarily stored service request to an application node.

2. The method according to claim 1, wherein the obtaining status information of a data node that corresponds to the service request comprises:
   obtaining an identifier of a data node that corresponds to a number segment to which a user identifier carried in the service request belongs; and
   obtaining current status information of the data node that corresponds to the identifier of the data node.

3. The method according to claim 2, wherein the method further comprises:
   when the status information of the data node indicates that the data node is available, delivering the service request to the application node.

4. The method according to claim 1, wherein the method further comprises:
   receiving an evaluation response message returned by the application node, wherein the evaluation response message carries status information of the data node; and
   updating the status information of the data node according to the received status information.

5. The method according to claim 2, wherein the rejecting to deliver the service request to an application node comprises:
   discarding the service request.

6. A service request processing method for an application node, comprising:
   receiving a service request sent by a load balancer;
   requesting, according to the service request, to access data in a data node, and when an access failure occurs, obtaining service level agreement (SLA) information of a session that corresponds to the service request;
   obtaining status information of the data node according to the SLA information; and
   sending an evaluation response message to the load balancer, wherein the evaluation response message carries the status information of the data node.

7. The method according to claim 6, wherein the obtaining service level agreement SLA information of a session that corresponds to the service request comprises:
   obtaining a start time and an end time at which the session that corresponds to the service request is processed; and
   determining a delay of the session according to the start time and the end time, wherein the SLA information comprises the delay.

8. The method according to claim 6, wherein the obtaining status information of the data node according to the SLA information comprises:
   evaluating the status information of the data node according to the SLA information and a fault threshold of a service; or reporting an identifier of the data node and the service level agreement SLA information of the session to an evaluation center, and receiving an evaluation response message returned by the evaluation center, wherein the evaluation response message carries the status information of the data node.

9. The method according to claim 8, wherein the evaluating the status information of the data node according to the SLA information and a fault threshold of a service comprises:

counting a quantity of service requests for which SLA information of corresponding sessions exceeds the fault threshold within a preset time;

when the quantity of service requests for which the SLA information exceeds the fault threshold within the preset time is greater than a first threshold, determining that the status information of the data node indicates that the data node is unavailable; and when the quantity of service requests for which the SLA information exceeds the fault threshold within the preset time is less than or equal to the first threshold, determining that the status information of the data node indicates that the data node is available.

10. The method according to claim 6, further comprising: after the status information of the data node is updated, sending an evaluation response message to the load balancer, wherein the evaluation response message carries the updated status information of the data node.

11. A load balancer, comprising:

a first receiving unit, configured to receive a service request reported by a network element, and obtain status information of a data node that corresponds to the service request; and a first processing unit, configured to: when the status information of the data node indicates that the data node is unavailable, reject to deliver the service request to an application node; or temporarily store the service request, and when the status information of the data node changes to that the data node is available, deliver the temporarily stored service request to an application node.

12. The load balancer according to claim 11, wherein the obtaining, by the first receiving unit, status information of a data node that corresponds to the service request comprises:

obtaining an identifier of a data node that corresponds to a number segment to which a user identifier carried in the service request belongs; and obtaining current status information of the data node that corresponds to the identifier of the data node.

13. The load balancer according to claim 11, further comprising:

a request delivering unit, configured to: when the status information of the data node indicates that the data node is available, deliver the service request to the application node.

14. The load balancer according to claim 11, wherein the first receiving unit is further configured to receive an evaluation response message returned by the application node, wherein the evaluation response message carries status information of the data node; and the load balancer further comprises a status updating unit, configured to update the status information of the data node according to the received status information.

15. An application node, comprising:

a second receiving unit, configured to receive a service request sent by a load balancer;

a session information obtaining unit, configured to: request, according to the service request, to access data in a data node, and when an access failure occurs, obtain service level agreement (SLA) information of a session that corresponds to the service request;

a status obtaining unit, configured to obtain status information of the data node according to the SLA information; and a response sending unit, configured to send an evaluation response message to the load balancer, wherein the evaluation response message carries the status information of the data node.

16. The application node according to claim 15, wherein the obtaining, by the session information obtaining unit, information of a session that corresponds to the service request comprises:

obtaining, by the session information obtaining unit, a start time and an end time at which the session that corresponds to the service request is processed; and determining a delay of the session according to the start time and the end time, wherein the SLA information comprises the delay.

17. The application node according to claim 15, wherein the obtaining, by the status obtaining unit, status information of the data node according to the SLA information comprises:

evaluating, by the status obtaining unit, the status information of the data node according to the SLA information and a fault threshold of a service; or reporting, by the status obtaining unit, an identifier of the data node and the service level agreement SLA information of the session to an evaluation center, and receiving an evaluation response message returned by the evaluation center, wherein the evaluation response message carries the status information of the data node.

* * * * *